US010039237B2

(12) United States Patent
Smith et al.

(10) Patent No.: US 10,039,237 B2
(45) Date of Patent: Aug. 7, 2018

(54) BALER ROTOR ASSEMBLY STRIPPERS

(71) Applicant: Vermeer Manufacturing Company, Pella, IA (US)

(72) Inventors: Luke Smith, Loveland, CO (US); Alex Knee, Urbandale, IA (US); Jacob Limke, Pella, IA (US); Calvin Meinders, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 41 days.

(21) Appl. No.: 15/183,231

(22) Filed: Jun. 15, 2016

(65) Prior Publication Data

US 2016/0366827 A1    Dec. 22, 2016

Related U.S. Application Data

(60) Provisional application No. 62/182,862, filed on Jun. 22, 2015.

(51) Int. Cl.
| | |
|---|---|
| *A01D 39/00* | (2006.01) |
| *A01D 43/02* | (2006.01) |
| *A01D 75/00* | (2006.01) |
| *A01F 15/10* | (2006.01) |
| *A01D 89/00* | (2006.01) |
| *A01D 90/04* | (2006.01) |

(52) U.S. Cl.
CPC .......... *A01F 15/106* (2013.01); *A01D 89/008* (2013.01); *A01D 90/04* (2013.01); *A01F 15/10* (2013.01); *A01F 2015/108* (2013.01)

(58) Field of Classification Search
CPC .. A01F 2015/108; A01F 15/106; A01F 15/10; A01F 2015/107; A01F 15/101; A01F 15/0833; A01F 17/00; A01F 29/02; A01F 29/10; A01D 90/04; A01D 89/002; A01D 89/008
See application file for complete search history.

(56) References Cited

U.S. PATENT DOCUMENTS

| 3,226,921 A * | 1/1966 | Shepley | A01D 57/02 53/341 |
|---|---|---|---|
| 4,161,859 A * | 7/1979 | Storm | A01D 89/002 56/364 |
| 4,581,879 A * | 4/1986 | Anstey | A01F 15/07 100/88 |

(Continued)

FOREIGN PATENT DOCUMENTS

| DE | 3535155 A1 * | 4/1987 | ............. A01D 90/04 |
|---|---|---|---|
| DE | 102008053267 A1 * | 4/2010 | ............. A01D 90/04 |

(Continued)

OTHER PUBLICATIONS

International Search Report, NL Patent Application 2015257, dated Jun. 22, 2015, pp. 1-12.

(Continued)

*Primary Examiner* — Arpad Fabian-Kovacs
(74) *Attorney, Agent, or Firm* — Armstrong Teasdale LLP (57) ABSTRACT

Rotor assemblies for conveying crop material from a pick-up device of a baler apparatus into the baling chamber may include a rotor stripper having a head section with a collar and a tail section removably attached to the head section to remove crop material from the rotating teeth of the assembly.

14 Claims, 12 Drawing Sheets

(56) References Cited

U.S. PATENT DOCUMENTS

| | | | | |
|---|---|---|---|---|
| 4,788,900 A * | 12/1988 | Berkers | A01F 15/07 | |
| | | | 100/88 | |
| 4,854,454 A * | 8/1989 | Dahlby | B07B 13/006 | |
| | | | 209/616 | |
| 5,595,055 A | 1/1997 | Horchler, Jr. et al. | | |
| 5,819,515 A * | 10/1998 | Ratzlaff | A01F 15/07 | |
| | | | 100/88 | |
| 5,848,523 A | 12/1998 | Engel et al. | | |
| 5,979,153 A * | 11/1999 | Roth | A01F 15/0833 | |
| | | | 100/88 | |
| 6,279,304 B1 | 8/2001 | Anstey et al. | | |
| 6,298,646 B1 * | 10/2001 | Schrag | A01F 15/101 | |
| | | | 100/88 | |
| 6,314,708 B1 | 11/2001 | Engel | | |
| 6,341,708 B1 | 1/2002 | Palley et al. | | |
| 6,370,856 B1 | 4/2002 | Engel | | |
| D470,514 S * | 2/2003 | Engel | D15/28 | |
| 6,526,736 B1 | 3/2003 | Anstey | | |
| 6,988,354 B1 | 1/2006 | Pargmann et al. | | |
| 7,124,568 B2 * | 10/2006 | Hotaling | A01F 15/106 | |
| | | | 100/88 | |
| 7,252,587 B2 * | 8/2007 | Viaud | A01D 90/04 | |
| | | | 460/109 | |
| 7,404,284 B2 * | 7/2008 | Viaud | A01F 17/00 | |
| | | | 100/6 | |
| 7,584,594 B2 * | 9/2009 | Viaud | A01F 15/106 | |
| | | | 56/341 | |
| 7,654,069 B1 * | 2/2010 | Dunham | A01D 89/008 | |
| | | | 56/190 | |
| 8,056,314 B1 * | 11/2011 | Anstey | A01F 15/106 | |
| | | | 56/364 | |
| 8,205,424 B1 * | 6/2012 | Lang | A01D 90/04 | |
| | | | 56/341 | |
| 8,959,883 B2 | 2/2015 | McClure et al. | | |
| D746,876 S * | 1/2016 | McClure | D15/28 | |
| 9,226,452 B2 * | 1/2016 | Biziorek | A01F 15/106 | |
| 9,578,809 B2 * | 2/2017 | Reiter | A01D 89/004 | |
| 2005/0262822 A1 * | 12/2005 | Hotaling | A01F 15/106 | |
| | | | 56/341 | |
| 2006/0005522 A1 * | 1/2006 | Pargmann | A01D 90/04 | |
| | | | 56/341 | |
| 2014/0096692 A1 * | 4/2014 | Baldauf | A01F 15/10 | |
| | | | 100/97 | |
| 2014/0109542 A1 | 4/2014 | McClure et al. | | |

FOREIGN PATENT DOCUMENTS

| | | | | |
|---|---|---|---|---|
| EP | 0076786 A1 * | 4/1983 | | A01D 90/04 |
| EP | 0470356 A2 | 2/1992 | | |

OTHER PUBLICATIONS

AGCO, Massey Ferguson Hesston 2846A, commercially available in 2014, pp. 1.

* cited by examiner

BALER ROTOR ASSEMBLY STRIPPERS

CROSS-REFERENCE TO RELATED APPLICATION

This application claims the benefit of U.S. Provisional Patent Application No. 62/182,862, filed Jun. 22, 2015, the contents of which are incorporated herein by reference in their entirety.

FIELD OF THE DISCLOSURE

The field of the disclosure relates to rotor assemblies for conveying crop forages from a pick-up device of a baler apparatus into the baling chamber and, in particular, rotor strippers used in such assemblies to remove crop forage material from the rotating teeth of the assembly.

BACKGROUND

Round balers have become an integral part of the agricultural industry and a variety of different types of balers are currently in use. Balers use a pick-up device to convey the crop material from the ground into the baling chamber. A rotor assembly moves the material from the pick-up device and upward toward the baling chamber. Before being incorporated into the growing bale, the crop forage material must be stripped and separated from the rotating components of the rotor assembly.

A need exists for baler rotor assemblies having stripper components that increase the ease in servicing the rotor assembly and that include interchangeable parts.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a rotor assembly stripper for removing crop material from tines of a pick-up device. The stripper includes a head section having a collar for attaching the stripper to a rotor assembly shaft. A tail section is removably attached to the head section. The head section or tail section has a tab and the other section defines a mounting member. The tab is sized and shaped to be received in the mounting member.

Another aspect of the present disclosure is directed to a rotor assembly for conveying crop material from a pick-up device and into a baling chamber. The rotor assembly includes a rotor shaft having an axis of rotation and a plurality of teeth attached to the rotor shaft for transferring the crop material from the pick-up device and toward the baling chamber. The rotor assembly includes a plurality of strippers for removing the crop material from the teeth. Each stripper includes a head section having a collar that surrounds the shaft and a tail section removably attached to the head section.

Yet another aspect of the present disclosure is directed to a rotor assembly for transferring crop material from a pick-up device and into a baling chamber. The rotor assembly includes a rotor shaft. A plurality of teeth are attached to the rotor shaft for transferring the crop material from the pick-up device and toward the baling chamber. The rotor assembly includes a plurality of strippers for removing the crop material from the teeth. Each stripper has a collar that fully surrounds the shaft. The strippers are not hinged.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
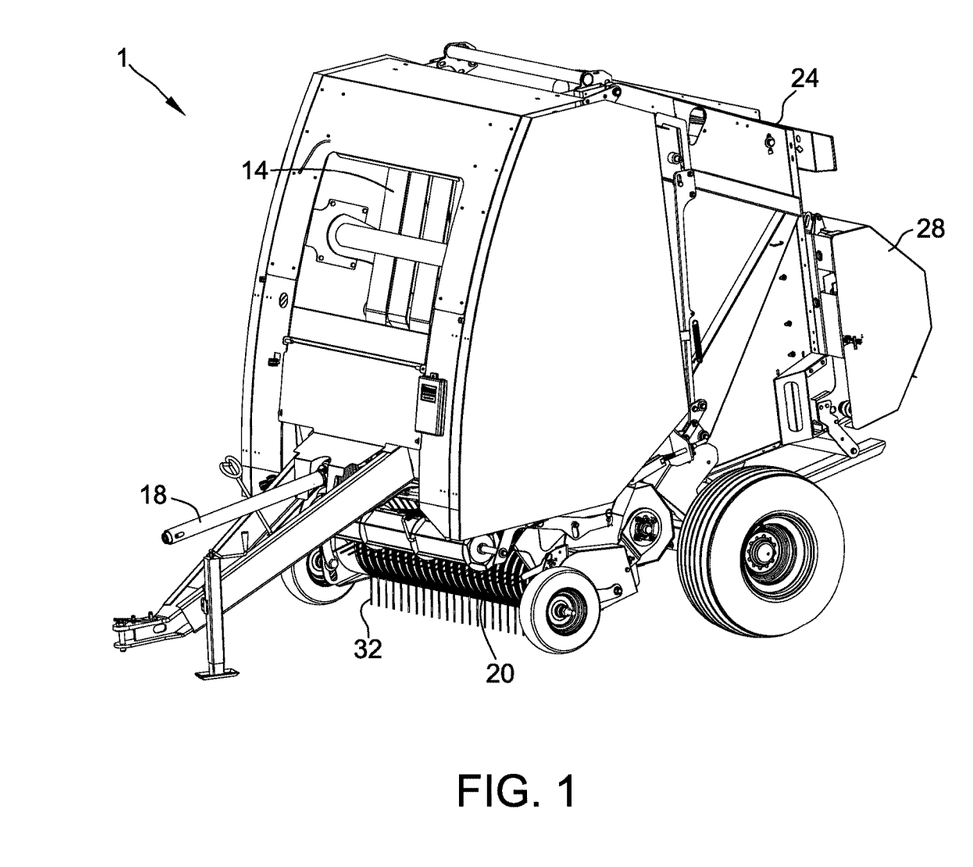
FIG. 1 is a perspective view of a round baler.
Figure 2:
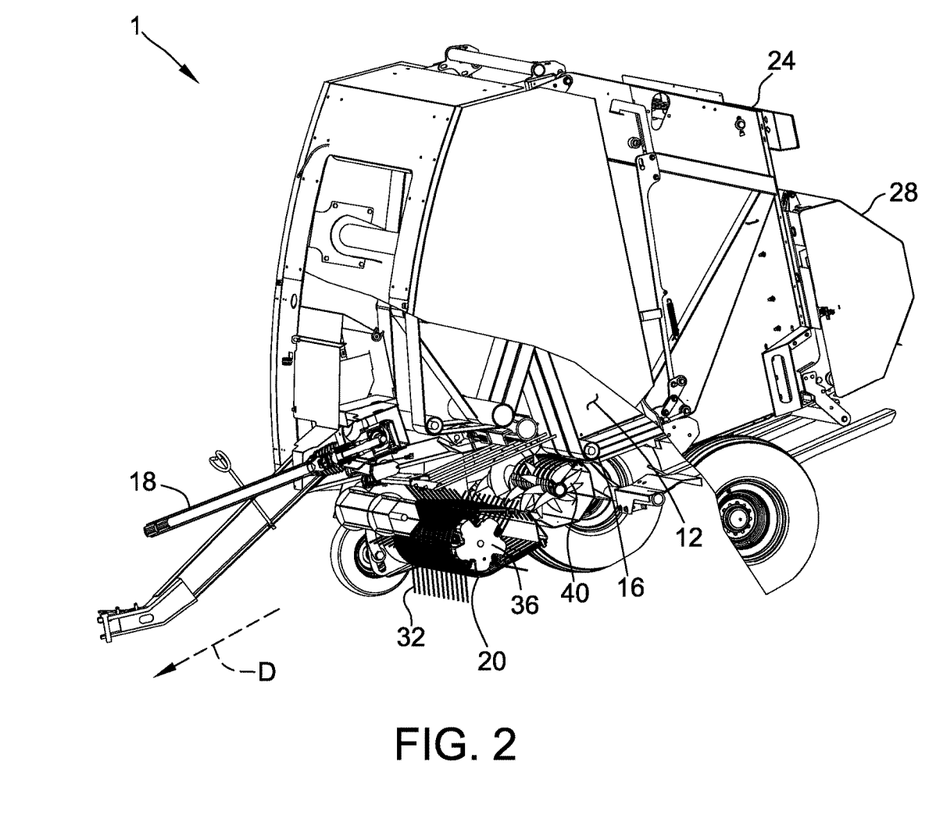
FIG. 2 is a perspective cross-section view of the round baler.

Referring now to FIGS. 1 and 2, an implement 1 for forming round bales from a baleable material such as crop material (e.g., hay or other forage material, straw, corn stover, switchgrass, sugar cane, etc.) is shown. While the implement 1 is generally shown and described herein as a round baler, any implement that includes a rotor assembly 40 for moving material such as loader wagons, silage packers and the like may be used. The baler 1 includes an expandable baling chamber 12 (FIG. 2) which operates by utilizing a series of bale forming belts 14 routed around a series of rollers 16. Alternatively, a single bale forming belt may be utilized. Additionally, the baler includes a PTO drive 18, a pick-up device 20, a single or a plurality of belt tighteners (not shown), and a lift gate 24.

As material is picked up by the pick-up device 20 and deposited in the baling chamber 12, the material is compressed by the plurality of bale forming belts 14. Tension is maintained in the bale forming belts by the series of belt tighteners to ensure a properly compressed bale. Once a full bale (not shown) is formed, pick-up is ceased, and a wrapping sequence is commenced by a wrapping device 28. The wrapping device 28 is configured to apply a layer of wrap material to the outer circumference of the completed bale. Once the wrapping sequence is completed, the operator ejects the full bale from the baling chamber 12 by opening the lift gate 24. The ejection sequence may be manually or automatically initiated.

The pick-up device 20 includes a number of tines 32 for transferring crop material from the surface over which the baler 1 travels and into the baling chamber 12. The pick-up device 20 includes a shaft 36 to which the tines 32 are attached. The tines 32 rotate about the shaft 36, pick-up crop material and transfer the crop material to a rotor assembly 40. The rotor assembly 40 conveys crop material from the pick-up device 20 into the baling chamber 12.

The rotor assembly 40 includes a rotor shaft 44 (FIG. 3) having an axis of rotation R. The assembly 40 includes a number of teeth 48 attached to the rotor shaft 44 for transferring the crop material from the pick-up device 20 (FIG. 2) and toward the baling chamber 12. The rotor assembly 40 also includes a first auger section 50 and a second auger section 51 which direct crop material conveyed at the two ends of the pick-up device 20 (FIG. 2) inward toward the teeth 48 for feeding into the baling chamber 12.

Figure 4:
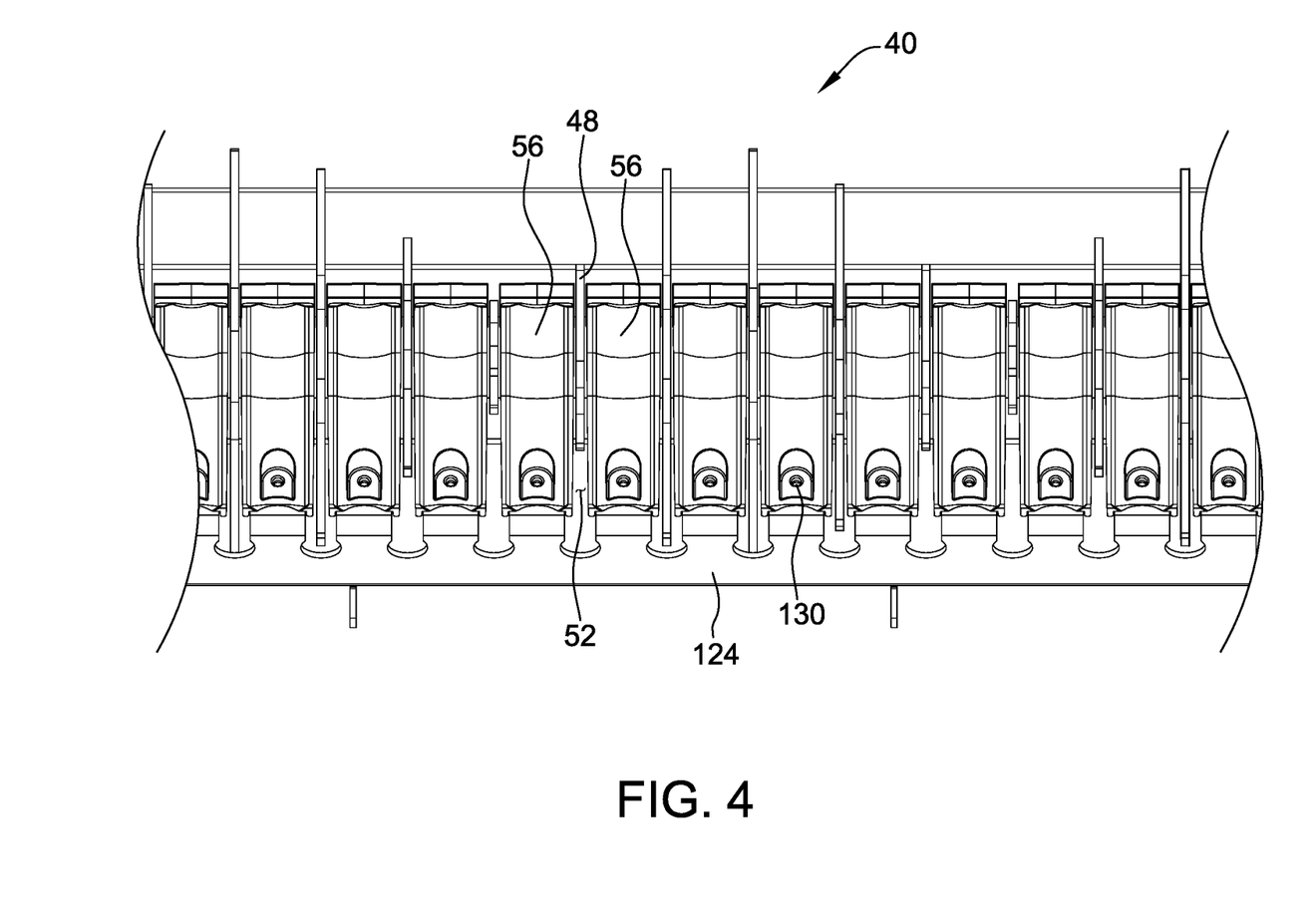
FIG. 4 is a top view of the rotor assembly.

As the teeth 48 rotate about the axis of rotation R in the direction indicated by arrow A, the teeth pass through spaces 52 (FIG. 4) formed between adjacent rotor assembly strippers (or simply "strippers") 56. The strippers 56 remove crop material from the teeth 48 and convey it toward the belts 14 (FIG. 2) to allow the material to be incorporated into the growing bale (not shown).

Each rotor assembly stripper 56 (FIG. 5) includes a head section 66 and a tail section 70 removably attached to the head section. As used herein, "removably attached" is intended to exclude embodiments in which the parts are integral (e.g., molded as one piece) and is intended to include embodiments in which the parts are attached by fasteners, self-fastening features, or the like.

Figure 3:
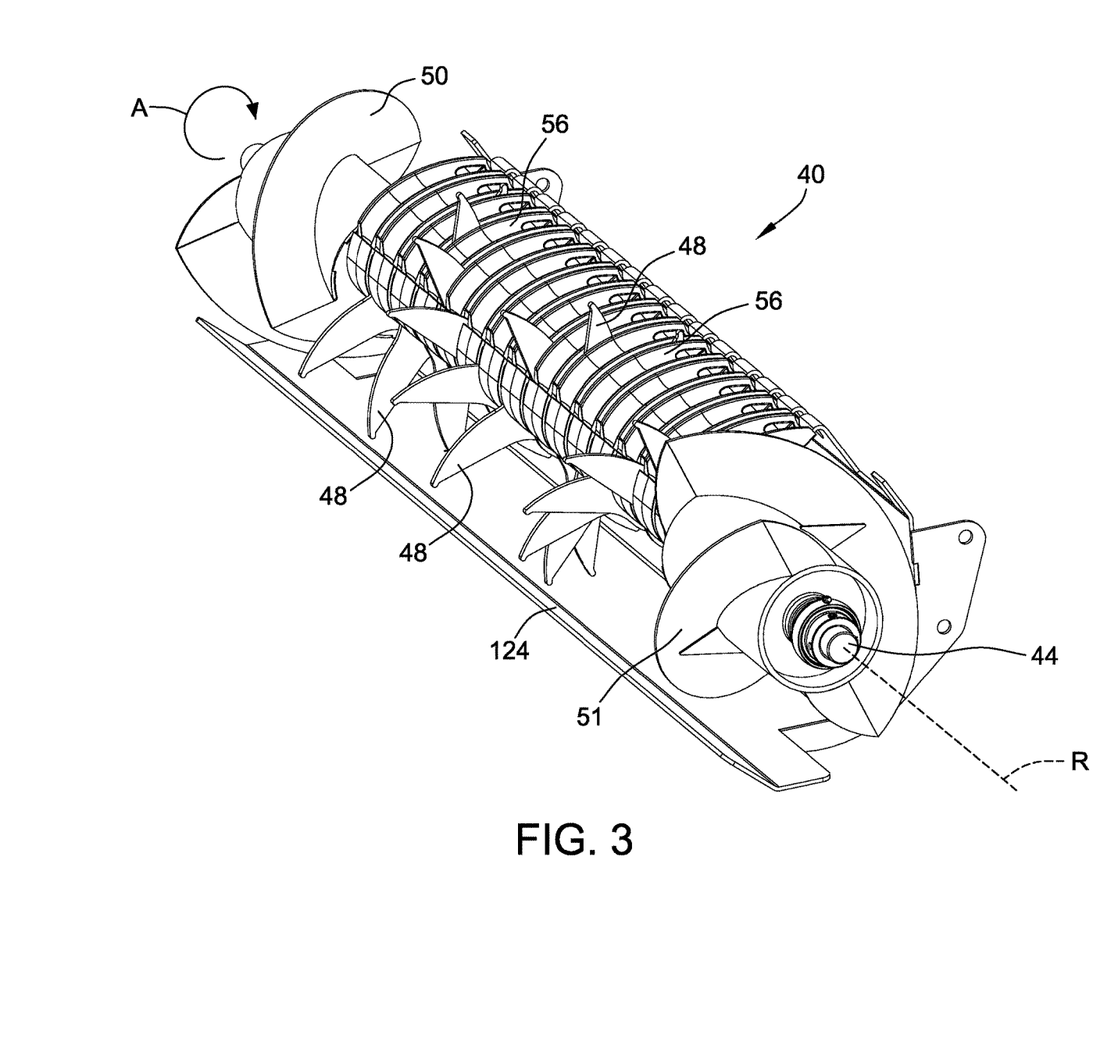
FIG. 3 is a perspective view of a rotor assembly of the round baler.
Figure 5:
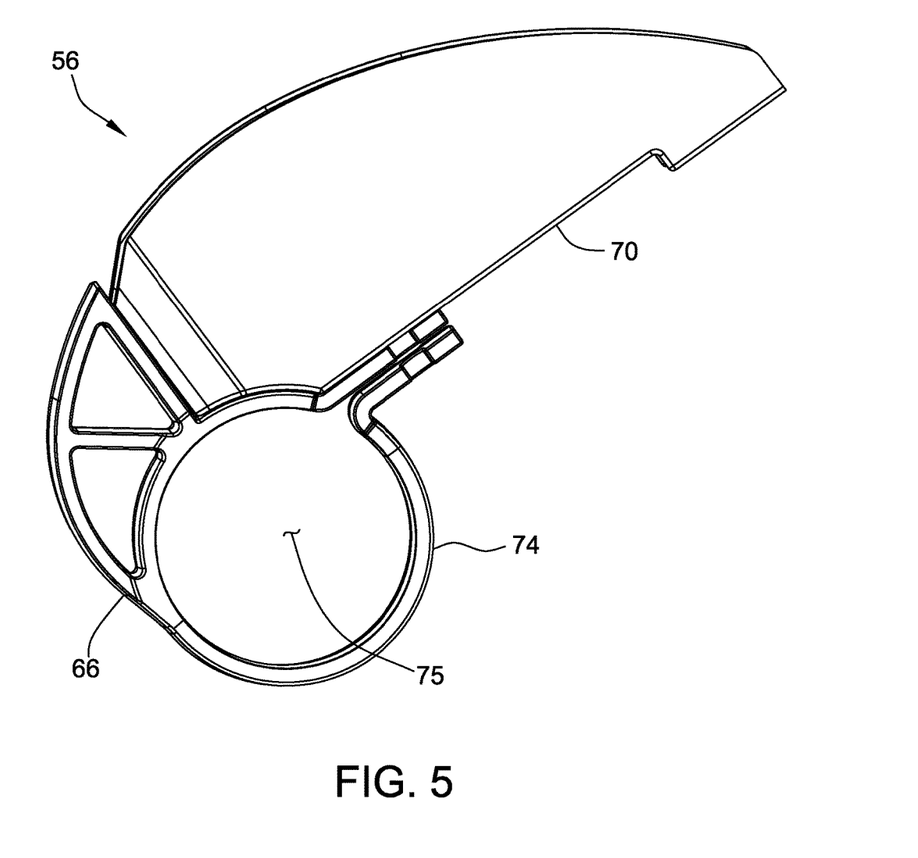
FIG. 5 is a side view of a rotor assembly stripper.

The head section 66 includes a collar 74 for attaching the stripper 56 to the rotor assembly shaft 44 (FIG. 3). The shaft 44 extends through an opening 75 formed by the collar 74. Generally the opening 75 is sized somewhat larger than the shaft 44 to allow the collar 74 to slide axially to prevent the stripper 56 from fracturing upon misalignment with a tooth 48.

The head section 66 of the stripper 56 includes an arcuate segment 76 (FIG. 6) that extends outward from the collar 74. The arcuate segment 76 has an outer surface 77 (FIG. 7) that extends from the collar 74 to a sidewall 78.

In the illustrated embodiment, the head section 66 includes a tab 80 (FIG. 6) for mating with a mounting member 82 (FIG. 8) of the tail section 70. In other embodiments, the tab 80 is part of the tail section 70, and the mounting member 82 is part of the head section 66. The tab 80 is sized and shaped to be received in the mounting member 82 (i.e., within a chamber formed within the mounting member 82) to attach the head section 66 to the tail section 70.

Figure 6:
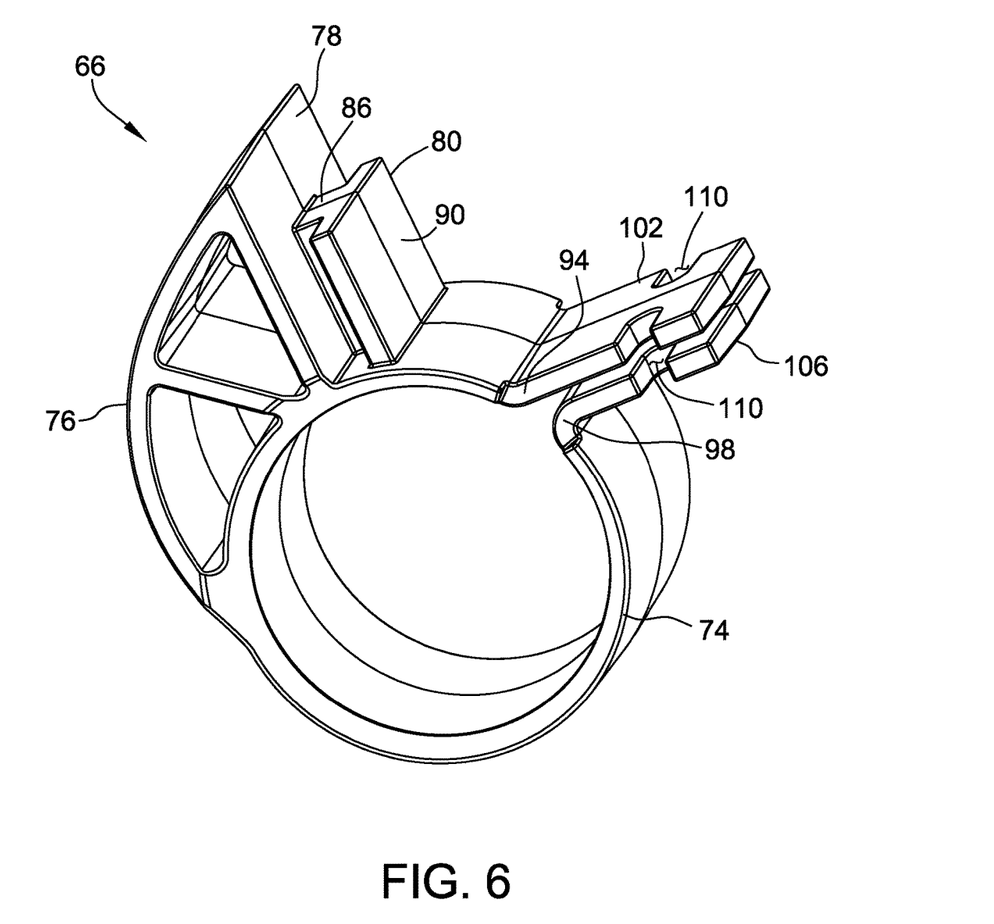
FIG. 6 is a perspective view of a head section of the rotor assembly stripper.
Figure 7:
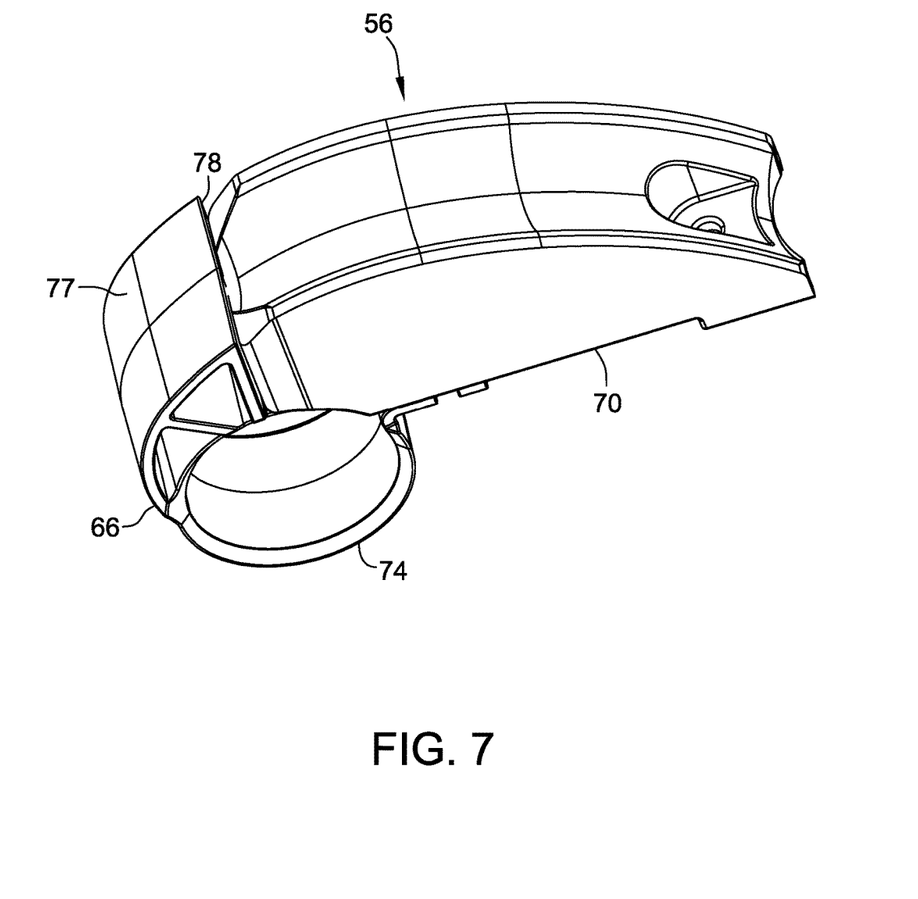
FIG. 7 is a perspective view of the rotor assembly stripper.
Figure 8:
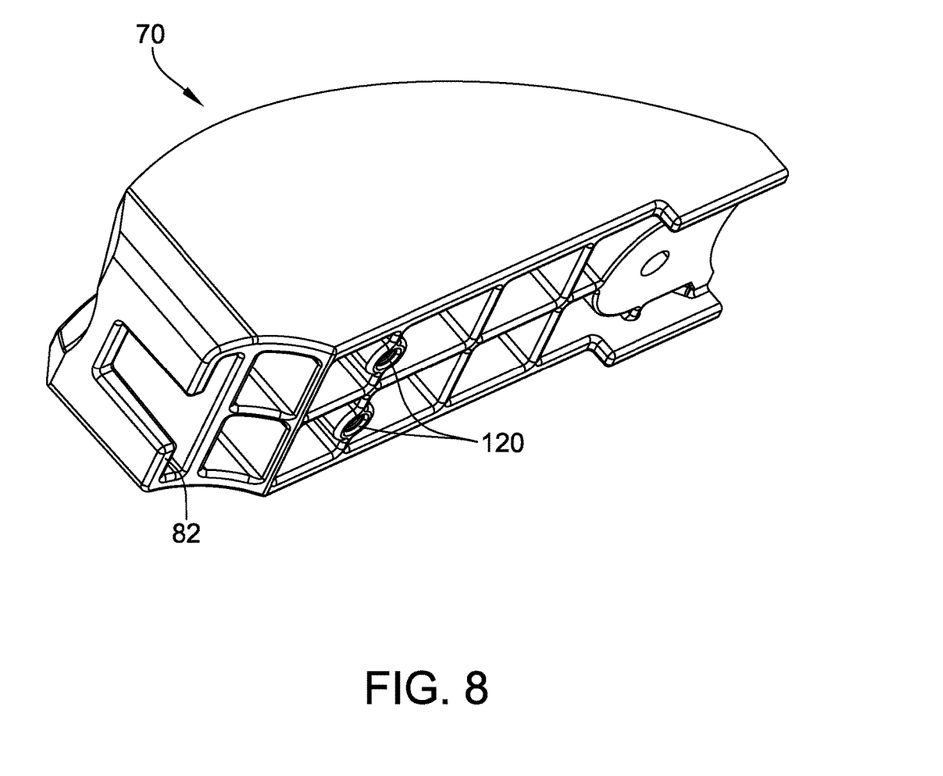
FIG. 8 is a perspective view of a tail section of the rotor assembly stripper.

The tab 80 includes a leg 86 that extends from the sidewall 78 of the head section 66. The tab 80 also includes a spanning member 90 that is atop the leg 86 and arranged at an angle (e.g., perpendicular) to the leg 86. The mounting member 82 forms a chamber having a shape that matingly corresponds to the shape of the tab 80 to allow the tab 80 to be received in the mounting member 82.

The collar 74 of the head section 66 includes a first end 94 and a second end 98. The first end 94 and the second end 98 are adjoined to close the collar 74. The first end 94 and the second end 98 are also capable of being separated (i.e., effectively opening the collar 74) to facilitate placement of the collar 74 around the rotor shaft 44 (FIG. 3). The head section 66 includes a first elongate fastening member 102 that extends from the first end 94 and a second elongate fastening member 106 that extends from the second end 98.

The rotor assembly strippers 56 may be constructed of any suitable material and are generally formed by molding a polymer in the desired shape.

The rotor assembly stripper 56 generally is not hinged and may be attached to the rotor shaft 44 (FIG. 3) by methods that do not involve closing a hinged connection around the shaft 44. In the illustrated embodiment, the head section 66 is formed (e.g., molded) such that the ends 94, 98 are adjoined (or nearly adjoined) in their relaxed position. The ends 94, 98 may be separated to place the collar 74 around the rotor shaft 44 (FIG. 3) by forcing the first and second fastening members 102, 106 apart and slipping the head section 66 over the rotor shaft and into the collar 74. Once in place, the inherent spring bias associated with the collar 74 brings the first and second fastening members 102, 106 together.

The first elongate fastening member 102 and the second elongate fastening member 106 are attached to the tail section 70 by inserting a fastener (not shown) through recesses 110 formed in the fastening members 102, 106 and through apertures 120 formed in the tail section 70.

As shown in FIG. 3, the rotor assembly 40 includes an arcuate rotor shield or "backbone" 124 that provides structural support for the assembly 40 and that collects crop material that falls below the strippers 56 to prevent the material from falling to the ground. The rotor shield 124 partially surrounds an outer arc of rotation of the teeth 48 of the assembly 40. Each rotor assembly stripper 56 is attached to the rotor shield 124 at its tail section 70 by use of a fastener (not shown) that is received in an opening 130 (FIG. 4) formed within the tail section 70.

In some embodiments, the head section 66 (FIG. 6) is interchangeable with different tail sections 70 (FIG. 8) such as tail sections 70 having different lengths. The various tail sections 70 may be sized differently depending on the size and model of baler with longer tail section lengths generally corresponding to larger balers.

Figure 9:
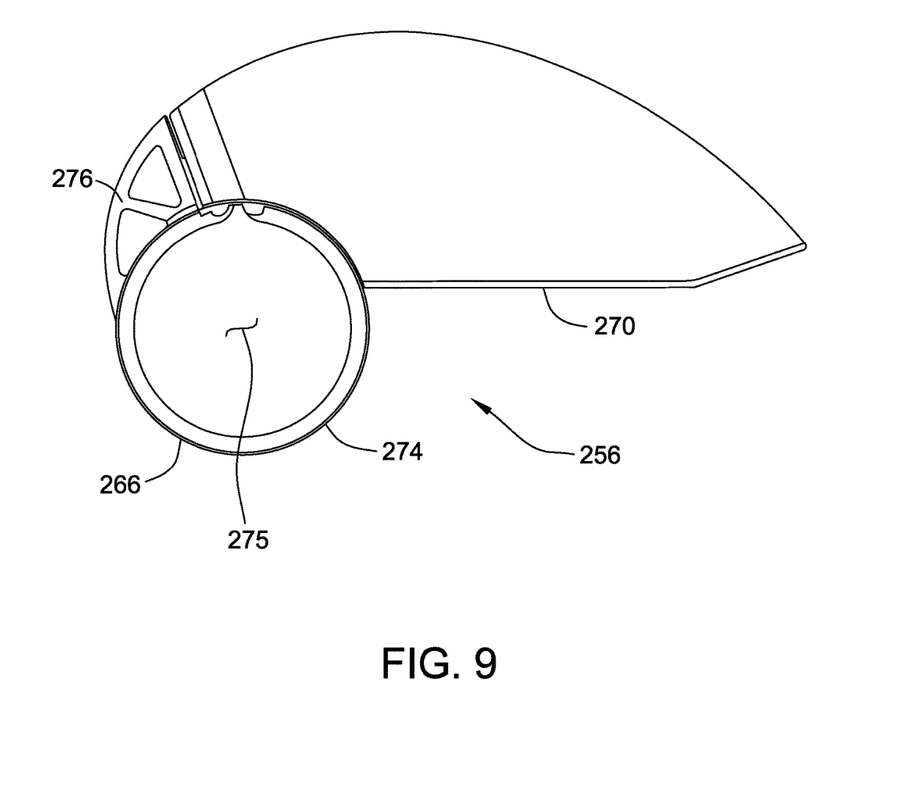
FIG. 9 is a side view of another embodiment of a rotor assembly stripper.
Figure 10:
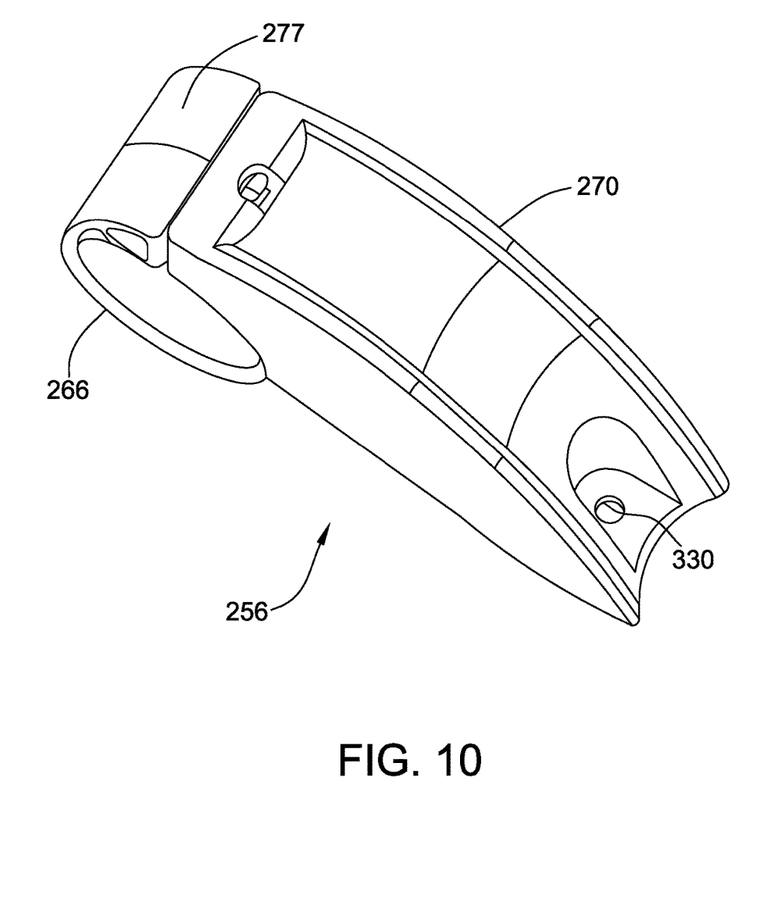
FIG. 10 is a perspective view of the rotor assembly stripper of FIG. 9.
Figure 11:
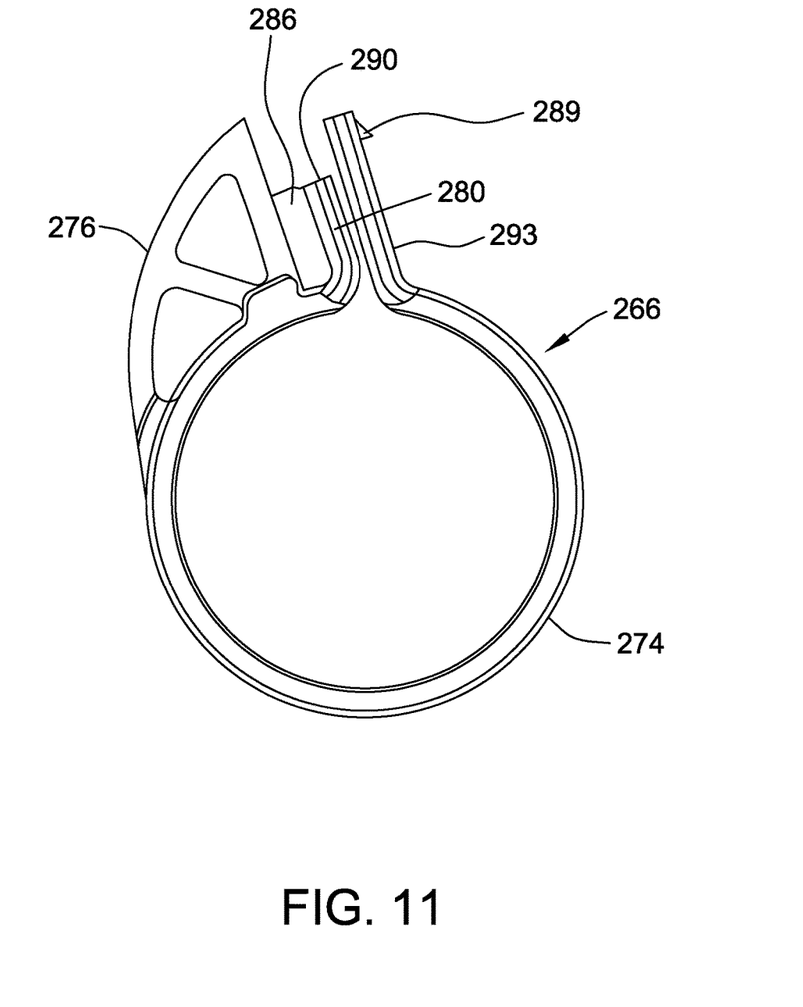
FIG. 11 is a side view of a head section of the rotor assembly stripper of FIG. 9.
Figure 12:
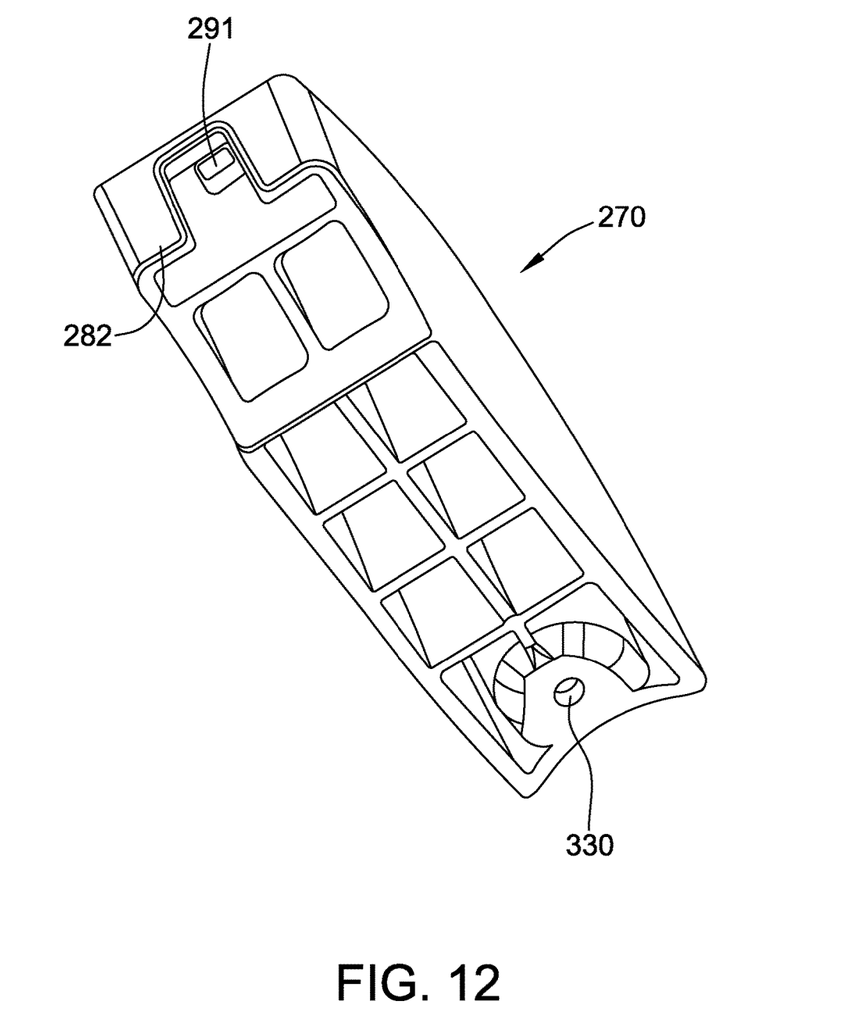
FIG. 12 is a perspective view of a tail section of the rotor assembly stripper of FIG. 9.

A second embodiment of a rotor assembly stripper is generally referenced as "256" in FIG. 9. The stripper components shown in FIGS. 9-12 that are analogous to those of FIGS. 1-8 are designated by the corresponding reference number of FIGS. 1-8 plus "200" (e.g., part 75 becomes part 275). The head section 266 of the stripper 256 includes a tab 280 and arm 293. Both the tab 280 and arm 293 are received in and mate with a mounting member 282 of the tail section 270. Upon insertion, a locking tab 289 of the head section 266 mates with a locking aperture 291 of the tail section 270 to secure the head section 266 to the tail section 270.

Compared to conventional rotor assembly strippers, the strippers 56 described above have several advantages. By including a two-piece design with a head section 66 and a tail section 70 (FIG. 5) that are removably attached to one another, the rotor assembly 40 (FIG. 3) may be maintained more simply. For instance, the user may clean out forage material built-up on the rotor shield by unfastening the tail section 70 from the rotor shield 124 (FIG. 4) and rotating the stripper 56 back (i.e., in a direction opposite of which the teeth 48 travel). In this manner maintenance may be performed without fully removing the stripper 56 from the rotor assembly 40. In instances in which the tail section 70 has worn or otherwise failed, the tail section 70 may be replaced without replacing the entire stripper 56. The two-piece design may allow the tail section 70 to be substituted for a different tail section of a different shape or material of construction (e.g., for different baleable materials) without replacing the head section 66. In embodiments in which the tab 80 (FIG. 6) includes a leg 86 and spanning member 90 (i.e., is t-shaped) positioned atop the leg 86, the tab 80 limits all lateral movement of the sections 66, 70 (i.e., all non-vertical movement).

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawings shall be interpreted as illustrative and not in a limiting sense.

What is claimed is:

1. A rotor assembly stripper for removing crop material from tines of a pick-up device, the stripper comprising:
    a head section comprising:
        a collar for attaching the stripper to a rotor assembly shaft, the collar having a first end and a second end, the first end and the second end being biased toward an adjoined position and being capable of being separated to place the collar around a rotor shaft;
        a first elongate fastening member that extends from the first end; and
        a second elongate fastening member that extends from the second end; and
    a tail section removably attached to the head section, the first elongate fastening member and the second elongate fastening member being attached to the tail section by a fastener, the head section or tail section having a tab and the other section defining a mounting member, the tab being sized and shaped to be received in the mounting member, the rotor assembly stripper not being hinged.

2. The rotor assembly stripper as set forth in claim 1, wherein the head section includes the tab, and the tail section includes the mounting member.

3. The rotor assembly stripper as set forth in claim 1, wherein the tab has a leg and a spanning member atop and angled to the leg, at least one of the leg and the spanning member being received in the mounting member.

4. The rotor assembly stripper as set forth in claim 3, wherein the head section has an arcuate segment that extends from the collar and further has an outer surface, the outer surface extending from the collar to a sidewall of the arcuate segment, the leg of the tab extending from the sidewall.

5. A rotor assembly for conveying crop material from a pick-up device and into a baling chamber, the rotor assembly comprising:
    a rotor shaft having an axis of rotation;
    a plurality of teeth attached to the rotor shaft for transferring the crop material from the pick-up device and toward the baling chamber;
    a plurality of strippers for removing the crop material from the teeth, each stripper comprising:
        a head section comprising:
            a collar that surrounds the shaft, the collar having a first end and a second end, the first end and the second end being biased toward an adjoined position and being capable of being separated to place the collar around the rotor shaft;
            a first elongate fastening member that extends from the first end; and
            a second elongate fastening member that extends from the second end; and
        a tail section removably attached to the head section, the first elongate fastening member and the second elongate fastening member being attached to the tail section by a fastener; and
    a stripper support, the tail section of each stripper being removably connected to the stripper support.

6. The rotor assembly as set forth in claim 5, wherein the head section or tail section has a tab, and the other section has a mounting member, the tab being received in the mounting member.

7. The rotor assembly as set forth in claim 6, wherein the head section includes the tab and the tail section includes the mounting member.

8. The rotor assembly as set forth in claim 6, wherein the tab has a leg and a spanning member atop and angled to the leg, at least one of the leg and spanning member being received in the mounting member.

9. The rotor assembly as set forth in claim 8, wherein the head section has an arcuate segment that extends from the collar and has an outer surface, the outer surface extending from the collar to a sidewall of the arcuate segment, the leg of the tab extending from the sidewall.

10. The rotor assembly as set forth in claim 5, wherein the stripper support is an arcuate rotor shield which partially surrounds an outer arc of rotation of the teeth, the tail section being removably attached to the rotor shield by a fastener.

11. The rotor assembly as set forth in claim 5, wherein the stripper is not hinged.

12. An apparatus for baling crop material, the baler comprising:
    a baling chamber;
    a pick-up device for transferring crop material from a surface over which the apparatus travels into the baling apparatus; and
    a rotor assembly as set forth in claim 5 for conveying the crop material from the pick-up device into the baling chamber.

13. A rotor assembly for transferring crop material from a pick-up device and into a baling chamber, the rotor assembly comprising:
    a rotor shaft;
    a plurality of teeth attached to the rotor shaft for transferring the crop material from the pick-up device and toward the baling chamber; and
    a plurality of strippers for removing the crop material from the teeth, each stripper comprising:
        a head section comprising:
            a collar that fully surrounds the shaft, the collar having a first end and a second end, the first end and the second end being biased toward an adjoined position and being capable of being separated to place the collar around the rotor shaft;

a first elongate fastening member that extends from the first end; and a second elongate fastening member that extends from the second end; and a tail section, the first elongate fastening member and the second elongate fastening member being attached to the tail section by a fastener, the strippers not being hinged.

14. The rotor assembly as set forth claim 13, the rotor assembly further comprising an arcuate rotor shield which partially surrounds an outer arc of rotation of the teeth, the stripper being attached to the rotor shield.

\* \* \* \* \*